(12) United States Patent
Bick

(10) Patent No.: US 6,924,789 B2
(45) Date of Patent: Aug. 2, 2005

(54) USER INTERFACE DEVICE

(75) Inventor: Andrew Raymond Bick, Surrey (GB)

(73) Assignee: Nokia Corporation, Espoo (FI)

( * ) Notice: Subject to any disclaimer, the term of this patent is extended or adjusted under 35 U.S.C. 154(b) by 609 days.

(21) Appl. No.: 09/942,373

(22) Filed: Aug. 29, 2001

(65) Prior Publication Data

US 2002/0049070 A1 Apr. 25, 2002

(30) Foreign Application Priority Data

Oct. 3, 2000 (GB) .............................................. 0024204

(51) Int. Cl.[7] .............................................. G09G 5/08
(52) U.S. Cl. ...................... 345/168; 345/170; 345/174; 345/169
(58) Field of Search ........................................ 455/550

(56) References Cited

U.S. PATENT DOCUMENTS

| 5,675,361 | A | | 10/1997 | Santilli |
| 5,887,995 | A | | 3/1999 | Holehan |
| 5,988,902 | A | | 11/1999 | Holehan |
| 6,224,278 | B1 | * | 5/2001 | Nishi .......................... 400/495 |
| 6,288,707 | B1 | | 9/2001 | Philipp |
| 6,498,600 | B1 | * | 12/2002 | Vance et al. ................. 345/168 |
| 6,680,731 | B2 | * | 1/2004 | Gerpheide et al. ........... 345/173 |
| 2001/0046081 | A1 | * | 11/2001 | Hayashi et al. .............. 359/296 |
| 2004/0041967 | A1 | * | 3/2004 | Maeda et al. ................ 349/113 |
| 2004/0108193 | A1 | * | 6/2004 | Schmiz et al. ............... 200/512 |

FOREIGN PATENT DOCUMENTS

| DE | 4222940 | 1/1994 |
| WO | 9805025 | 2/1998 |

* cited by examiner

*Primary Examiner*—Creighton Smith
(74) *Attorney, Agent, or Firm*—Ware Fressola Van Der Sluys & Adolphson, LLP

(57) ABSTRACT

A keypad (7) of a mobile telephone handset comprises a keymat (17) beneath which are disposed capacitive sensing plates (20, 21). The keypad may be used in a conventional manner to enter alphanumeric data by pressing keys (18) or as a touch pad by sliding a finger over the surface of the keymat (17).

35 Claims, 3 Drawing Sheets

USER INTERFACE DEVICE

FIELD OF THE INVENTION

The present invention relates to a user interface device particularly but not exclusively for a mobile telephone handset or digital communicator handset.

BACKGROUND ART

Portable electronic apparatus are increasingly able to support powerful software applications requiring sophisticated user interfaces. For example, laptop computers, mobile telephone handsets, personal digital assistants (PDAs) and digital communicator handsets can run browser software which enables a user to navigate content on a web page by selecting hypertext links.

Conventional mobile telephone handsets have an alphanumeric keypad comprising a set of dual-state keys arranged in a grid pattern. Although the keypad is appropriate for entering text and numbers, it is not particularly suited to navigating a web page because movement of a pointer or cursor is restricted to discrete steps and is constrained to orthogonal directions defined by the grid pattern.

The present invention seeks to provide an improved user interface.

SUMMARY OF THE INVENTION

According to the present invention, there is provided a user interface device for electronic apparatus, the device comprising a keypad having a plurality of keys each arranged to actuate a respective switch so as to provide a first type of user input and integrally disposed impedance sensor so as to provide a second type of user input.

The keypad may include a region provided with said impedance sensor but without a key. The keys may be comprised in a keymat and the impedance sensor may be disposed beneath the keymat. The keymat and the impedance sensor may be coextensive. The keys may comprise silicone rubber and may include a hard coat.

The impedance sensor may be arranged to detect the presence of a digit and may comprise first and second sensing plates.

The first sensing plate may comprise a first set of electrodes, arranged in non-contiguous stripes. The electrodes may be transparent and made from indium-tin-oxide. The first sensing plate may comprise a substrate, which is transparent and made from polyethylene terephthalate.

The second sensing plate may comprise a second set of electrodes. The first and second set of electrodes are spaced apart. A first member of the first set of electrodes and a first member of the second set of electrodes may be arranged to have a mutual capacitance and configured so to allow the mutual impedance to change when a digit touches the keypad.

The impedance sensor may be a capacitive sensor.

The device may further comprise a light source to illuminate the keypad, disposed behind the keys and may be planar. The light source is an electroluminescent layer.

The first type of user input may be input of alphanumeric data and the second type of user input may be control of a focus on a display of the electronic apparatus.

According to the present invention there is also provided an electronic apparatus incorporating a user interface device comprising a keypad having a plurality of keys each arranged to actuate a respective switch so as to provide a first type of user input and integrally disposed impedance sensor so as to provide a second type of user input.

The electronic apparatus may be portable and may be a mobile telephone, communicator handset or personal computer.

According to the present invention there is also provided a method of fabricating a user interface device for electronic apparatus, the method comprising providing a keypad having a plurality of keys each arranged to actuate a respective switch so as to provide a first type of user input and integrally disposing impedance sensor so as to provide a second type of user input.

BRIEF DESCRIPTION OF THE DRAWINGS

An embodiment of the present invention will now be described by way of example with reference to the accompanying drawings, in which.

PREFERRED EMBODIMENT OF THE INVENTION

Figure 1:
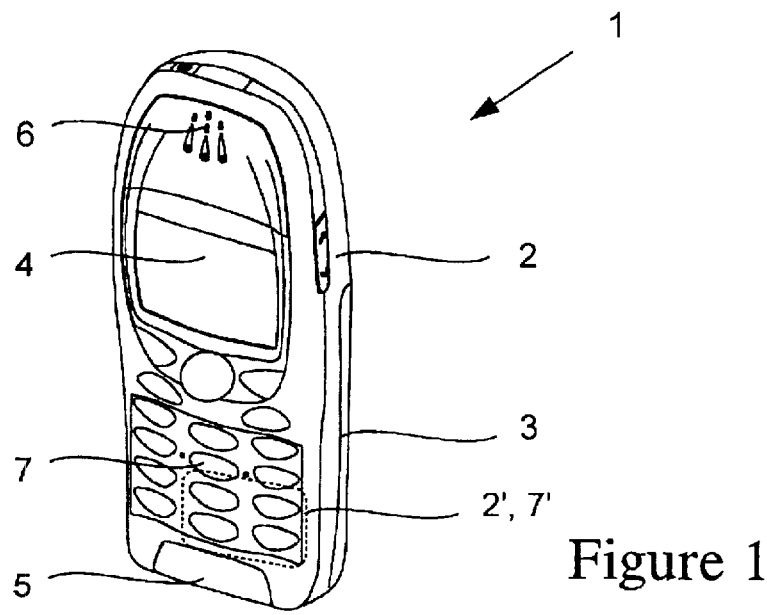
FIG. 1 is a perspective view of a mobile telephone handset.
Figure 2:
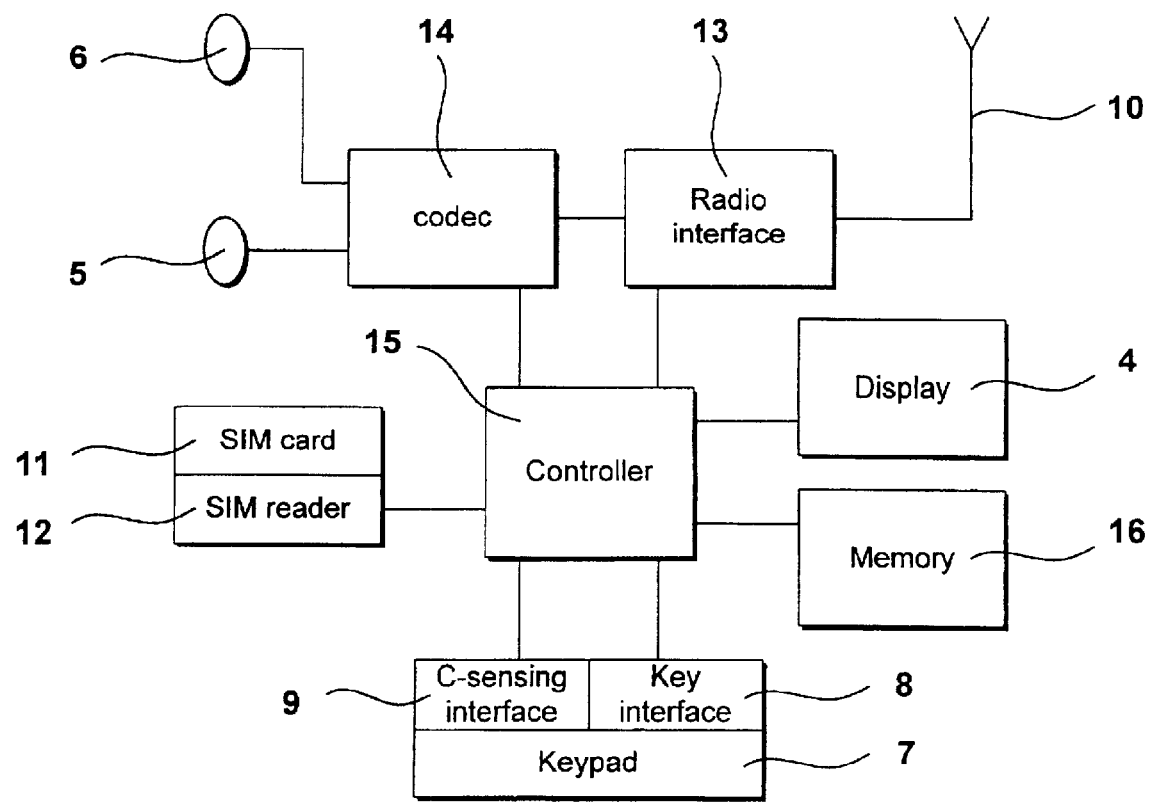
FIG. 2 is a schematic diagram of mobile telephone circuitry.
Figure 3:
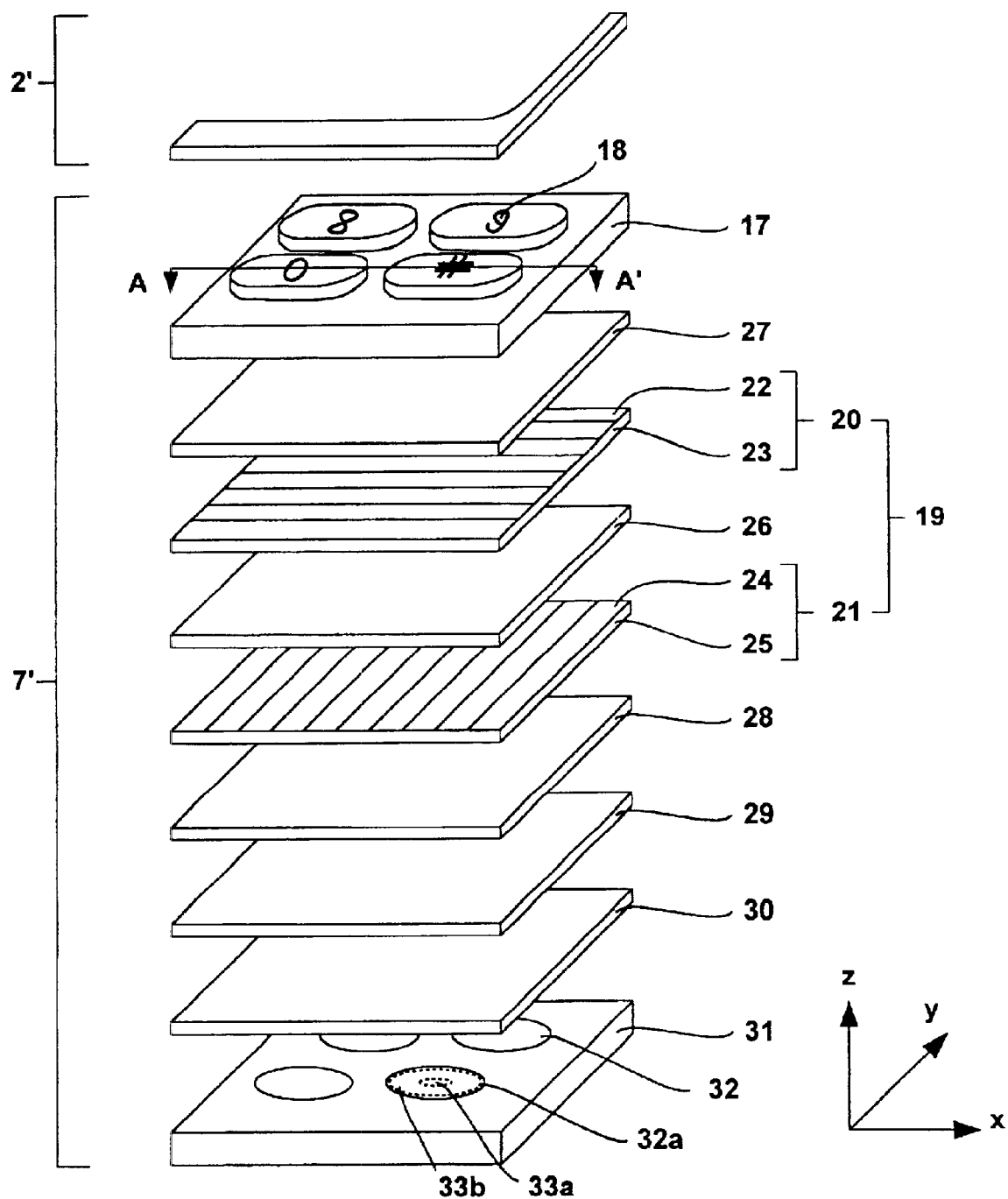
FIG. 3 is an exploded perspective view of an embodiment of the present invention.

Referring to FIGS. 1 and 2, a mobile telephone handset 1 comprises a case 2, a battery 3, a liquid crystal display (LCD) panel 4, a microphone 5, ear piece 6, a keypad 7 having a key interface 8 and a capacitive sensor interface 9, an antenna 10, subscriber identification module (SIM) card 11 and SIM card reader 12. The mobile telephone circuitry includes radio interface circuitry 13, codec circuitry 14, controller 15 and memory 16. Individual circuits and elements are of a type well-known in the art, for example a Nokia range in mobile telephones.

Figure 4:
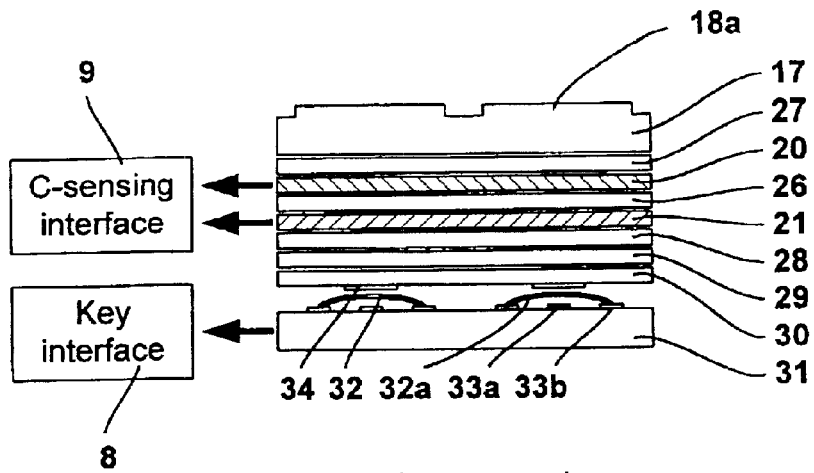
FIG. 4 is cross-sectional view taken along the line A–A' as shown in FIG. 3.
Figure 5:
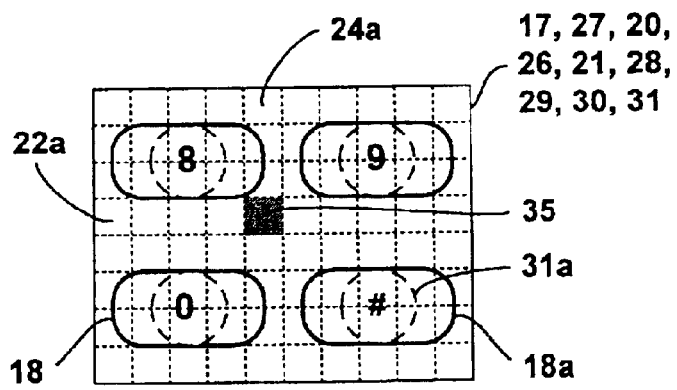
FIG. 5 is a plan view of the embodiment shown in FIG. 3.

Referring to FIGS. 1, 3, 4 and 5, cutaway portions 7', 2' of the keypad 7 and case 2 are shown. The keypad 7 comprises a silicone rubber keymat 17 having a plurality of keys 18. Letters and numerals are laser-etched into the surface of the keys 18 and the keys 18 are provided with a hard protective coat (not shown). A capacitive sensor 19 lies beneath the keymat 17 and comprises first and second sensing plates 20, 21. The first sensing plate 20 comprises a first set of striped indium-tin-oxide (ITO) electrodes 22 mounted on a first polyethylene terephthalate (PET) substrate 23. Similarly, the second sensing plate 21 comprises a second set of striped ITO electrodes 24 mounted on a second PET substrate 25. The first and second sets of electrodes 22, 24 run in orthogonal directions. For example, the first set of electrodes 22 are arranged to run parallel to the x-axis, while the second set of electrodes 24 run parallel to the y-axis. The first and second sensing plates 20, 21 are bonded together by means of a first optical adhesive layer 26. A second optical adhesive layer 27 is used to bond the sensor 19 to the keymat 17. A third optical adhesive layer 28 is used to bond an electroluminescent back light layer 29 to the underside of the sensor 19. When powered, the electroluminescent layer 29 illuminates the letters and numerals etched into the keys 18. The electroluminescent layer 29 is mounted to a dome adhesive gasket 30 which is adhered to a flexible substrate 31 on which metal dome switches 32 are mounted. Each dome 32 lies beneath a respective key 18, for example as shown in FIGS. 4 and 5. First and second metal contacts 33a, 33b are mounted on the substrate 31 beneath each dome 32. The second contact 33b is concentric with the first contact 33a. Each dome 32 sits upon a respective second metal contact 33b having the greater radius of the two contacts 33a, 33b. Respective nodules 34 on the underside of the dome adhesive gasket are used to help increase the so-called "snap ratio force" of the domes 32 when force is applied to the keys 18. Thus, this provides better tactile feel when the keys 18 are pressed.

The keypad 7 may operate as a conventional keypad and, either independently or simultaneously, as a touch sensitive pointing device.

As a conventional keypad, a user depresses a "hash" key 18a and force is transmitted through underlying layers 20, 21, 26, 27, 28, 29, 30 to deform a first key dome 32a lying underneath. Deformation of the first key dome 32a completes electrical connection between the first and second contacts 33a, 33b. This causes a signal to be generated and processed by the key interface 8 and the controller 15 in a well-known manner. This may result in the screen 4 displaying a "#" symbol. In this example, the key interface 8 generates signals which are passed to the controller 15 which runs suitable keypad driver software.

Figure 6:
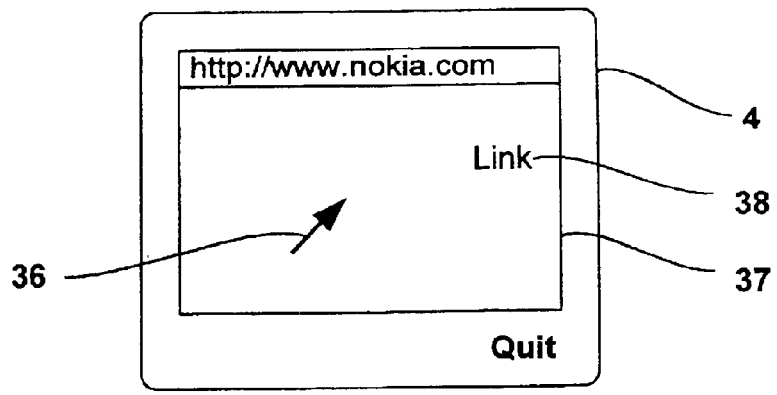
FIG. 6 shows a pointer displayed on a screen of the mobile telephone handset.

As a touch-sensitive pointing device, a user lightly touches the keymat 17 without exerting enough force to depress any of the keys 18. Beneath the user's finger lies an intersection 35 of a first electrode 22a of the first sensing plate 20 and a second electrode 24a of the second sensing plate 21. The user's finger modifies the mutual capacitance between the first and second electrodes 22a, 24a, which is detected by sensor interface 9 in a well-known manner so as to determine the co-ordinate of the user's finger, which is fed to the controller 15. The controller runs suitable touchpad driver software. The user slides their finger over the surface of the keymat 17 and uses it as if it were a conventional touch pad. This is particularly useful when navigating a cursor 36 around a web page 37 displayed on the display 4 in order to select a hypertext link 38 as shown in FIG. 6. Hypertext link 38 may be selected by lightly double tapping on the surface of the keymat 17. In this example, the whole area of the keymat 17 serves as a touch pad and not simply the keys 18. There are regions of the keymat 17, for example between the keys 18, where the user is not able to press a key but is able to control the cursor using capacitive sensor pointing device. It will be appreciated that the user need not touch the keypad 7 to change the mutual capacitance between the electrodes. For example, the change in mutual capacitance may be sufficient enough to be detected if the user holds their finger less than a millimetre above the surface of the keypad 7.

It will be appreciated that many modifications may be made to the embodiment hereinbefore described. For example, a resistive sensor, such as those used in resistive touch sensitive screens, may be used instead of a capacitive sensor. The sensor substrate may be made from other suitable plastics materials such as acrylic or polythene. The electrodes may be made from other conductive materials such as conductive polymers or thin metallic films. The keys need not be proud of the keypad. The keypad may be integrated into the case of the handset. A portion of the area of the keymat may serve as a touch pad.

It will be appreciated that the invention can be used in relation to any sort of electronic apparatus, be it portable and non-portable. This may include mobile telephone handsets and laptop computers. It may also be used in a remote control unit for electronic apparatus such as television sets, multimedia set-top boxes and audio equipment.

What is claimed is:

1. A user interface device for electronic apparatus, the device comprising a keypad having a plurality of keys each arranged to actuate a respective switch so as to provide a first type of user input for entering alphanumeric data and an integrally disposed impedance sensor so as to provide a second type of user input for operating the keypad as a touch sensitive pointing device.

2. A device according to claim 1, wherein the keypad includes a region provided with said impedance sensor but without a key.

3. A device according to claim 1, wherein said impedance sensor senses a co-ordinate of a user's finger.

4. A device according to claim 3, wherein the impedance sensor is disposed adjacently to the keymat.

5. A user interface device for electronic apparatus, the device comprising a keypad having a plurality of keys each arranged to actuate a respective switch so as to provide a first type of user input and an integrally disposed impedance sensor so as to provide a second type of user input wherein said keys comprise a keymat and wherein the keymat and the impedance sensor are coextensive.

6. A device according to claim 1, wherein the keys comprise silicone rubber.

7. A device according to claim 1, wherein the keys include a hard coat.

8. A device according to claim 1, wherein the impedance sensor is arranged to detect the presence of a digit.

9. A device according to claim 1, wherein the impedance sensor comprises first and second sensing plates.

10. A device according to claim 9, wherein the first sensing plate comprises a first set of electrodes.

11. A device according to claim 10, wherein the electrodes are arranged in noncontiguous stripes.

12. A user interface device for electronic apparatus, the device comprising a keypad having a plurality of keys each arranged to actuate a respective switch so as to provide a first type of user input and integrally disposed impedance sensor so as to provide a second type of user input, wherein the impedance sensor comprises first and second sensing plates and the first sensing plate comprises a first set of electrodes, and wherein the electrodes are transparent.

13. A device according to claim 10, wherein the electrodes are made from indium-tin-oxide.

14. A device according to claim 9, wherein the first sensing plate comprises a substrate.

15. A user interface device for electronic apparatus, the device comprising a keypad having a plurality of keys each arranged to actuate a respective switch so as to provide a first type of user input and integrally disposed impedance sensor so as to provide a second type of user input, wherein the impedance sensor comprises first and second sensing plates, wherein the first sensing plate comprises a substrate, and wherein the substrate is substantially transparent.

16. A user interface device for electronic apparatus, the device comprising a keypad having a plurality of keys each arranged to actuate a respective switch so as to provide a first type of user input and integrally disposed impedance sensor so as to provide a second type of user input, wherein the impedance sensor comprises first and second sensing plates, wherein the first sensing plate comprises a substrate, and wherein the substrate is made from polyethylene terephthalate.

17. A device according to claim 10, wherein the second sensing plate comprises a second set of electrodes.

18. A device according to claim 17, wherein the first and second set of electrodes are spaced apart.

19. A device according to claim 18, wherein a first member of the first set of electrodes and a first member of the second set of electrodes are arranged to have a mutual capacitance.

20. A device according to claim 19, wherein said members are arranged so to allow the mutual capacitance to change when a digit touches the keypad.

21. A device according to claim 1, wherein the impedance sensor is a capacitive sensor.

22. A user interface device for electronic apparatus, the device comprising a keypad having a plurality of keys each arranged to actuate a respective switch so as to provide a first type of user input and integrally disposed impedance sensor so as to provide a second type of user input, further comprising a light source to illuminate the keypad.

23. A device according to claim 22, wherein the light source is disposed behind the keys.

24. A device according to claim 22, wherein the light source is planar.

25. A device according to claim 22, wherein the light source is an electroluminescent layer.

26. A device according to claim 1 wherein the first type of user input is input of alphanumeric data.

27. A device according to claim 1 wherein the second type of user input is control of a focus on a display of the electronic apparatus.

28. Electronic apparatus incorporating a device according to claim 1.

29. Electronic apparatus according to claim 28, which is portable.

30. A mobile telephone handset incorporating a device according to claim 1.

31. An electronic communicator handset incorporating a device according to claim 1.

32. A portable computer incorporating a device according to claim 1.

33. A method of fabricating a user interface device for electronic apparatus comprising providing a keypad having a plurality of keys each arranged to actuate a respective switch so as to provide a first type of user input for entering alphanumeric data and integrally disposing an impedance sensor so as to provide a second type of user input for operating the keypad as a touch sensitive pointing device.

34. The method of claim 33, wherein said impedance sensor is for sensing a co-ordinate of a user's finger.

35. The device of claim 1, wherein said second type of user input comprises a user sliding a finger over a surface of said keypad for use as a touchpad.

* * * * *